US011501222B2

(12) United States Patent
Taher et al.

(10) Patent No.: US 11,501,222 B2
(45) Date of Patent: Nov. 15, 2022

(54) TRAINING OPERATORS THROUGH CO-ASSIGNMENT

(71) Applicant: INTERNATIONAL BUSINESS MACHINES CORPORATION, Armonk, NY (US)

(72) Inventors: Luke Taher, Heswall (GB); David Jon Griffin, Reigate (GB); Matthew Richard James Thornhill, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/824,737

(22) Filed: Mar. 20, 2020

(65) Prior Publication Data

US 2021/0295237 A1   Sep. 23, 2021

(51) Int. Cl.
 *G06Q 10/06*   (2012.01)
(52) U.S. Cl.
 CPC ............. *G06Q 10/063112* (2013.01); *G06Q 10/06398* (2013.01); *G06Q 10/063114* (2013.01); *G06Q 10/063118* (2013.01)
(58) Field of Classification Search
 None
 See application file for complete search history.

(56) References Cited

U.S. PATENT DOCUMENTS

| 6,507,821 | B1 | 1/2003 | Stephanou | |
| 8,126,870 | B2 * | 2/2012 | Chowdhuri | ....... G06F 16/24532 707/713 |
| 8,943,154 | B1 * | 1/2015 | Bodell | ............... H04L 41/0604 709/206 |
| 9,753,800 | B1 * | 9/2017 | Jadunandan | ........ H04L 41/5067 |

(Continued)

FOREIGN PATENT DOCUMENTS

| CA | 3124349 A1 * | 6/2020 | ........... G06Q 30/016 |
| WO | 2018175551 A1 | 9/2018 | |

OTHER PUBLICATIONS

Strüber, Daniel. "Generating efficient mutation operators for search-based model-driven engineering." International Conference on Theory and Practice of Model Transformations. Springer, Cham, 2017. (Year: 2017).*

(Continued)

*Primary Examiner* — Thomas L Mansfield
(74) *Attorney, Agent, or Firm* — Elliot J. Shine

(57) ABSTRACT

A method, a computer program product, and a computer system co-assign operators to service an incident with a first operator educating a second operator of skills used in servicing the incident. The method includes determining a type of incident and determining a command group used for the type of incident according to a first mapping based on historical resolutions of historical incidents. The method includes determining the first operator for co-assignment according to a second mapping based on successful historical resolutions of historical incidents by the first operator.

(Continued)

The method includes determining the second operator for the co-assignment according to the second mapping that further maps the command group and the second operator based on a lack of experience in using the command group. The method includes co-assigning the incident to the first operator and the second operator.

18 Claims, 7 Drawing Sheets

(56) References Cited

U.S. PATENT DOCUMENTS

| | | | |
|---|---|---|---|
| 9,779,386 B2 | 10/2017 | Swierz, III | |
| 9,785,988 B2 | 10/2017 | Petri | |
| 10,263,836 B2 | 4/2019 | Jain | |
| 10,395,323 B2 | 8/2019 | Aqlan | |
| 10,904,383 B1* | 1/2021 | Thornhill | H04M 3/4933 |
| 10,977,222 B1* | 4/2021 | Esman | G06F 16/212 |
| 2002/0029167 A1 | 3/2002 | Müller | |
| 2006/0233310 A1* | 10/2006 | Adams, Jr. | H04L 41/507 |
| | | | 379/2 |
| 2008/0181100 A1* | 7/2008 | Yang | H04L 41/0654 |
| | | | 370/216 |
| 2009/0012833 A1 | 1/2009 | Kuhlke | |
| 2009/0292954 A1* | 11/2009 | Jiang | H04L 41/0681 |
| | | | 714/47.2 |
| 2010/0069035 A1* | 3/2010 | Johnson | G06Q 30/0633 |
| | | | 455/566 |
| 2010/0083029 A1 | 4/2010 | Erickson | |
| 2010/0198659 A1 | 8/2010 | Meltzer | |
| 2012/0282576 A1 | 11/2012 | Chenoweth | |
| 2013/0339515 A1* | 12/2013 | Radhakrishnan | H04L 41/142 |
| | | | 709/224 |
| 2014/0068348 A1 | 3/2014 | Mondal | |
| 2014/0180738 A1 | 6/2014 | Phillipps | |
| 2015/0347950 A1 | 12/2015 | Goyal | |
| 2016/0055443 A1 | 2/2016 | Chee | |
| 2016/0179598 A1* | 6/2016 | Lvin | H04L 41/0636 |
| | | | 714/48 |
| 2017/0132724 A1 | 5/2017 | Aqlan | |
| 2017/0221373 A1 | 8/2017 | Dasgupta | |
| 2017/0249283 A1 | 8/2017 | Gupta | |
| 2017/0304707 A1 | 10/2017 | Morton | |
| 2018/0060785 A1* | 3/2018 | Carnevale | G06Q 10/063112 |
| 2018/0060786 A1 | 3/2018 | Venkataraman | |
| 2018/0242990 A1 | 8/2018 | Dryden | |
| 2019/0130413 A1 | 5/2019 | Nelson | |
| 2019/0197457 A1 | 6/2019 | Chan | |
| 2019/0215236 A1 | 7/2019 | Jain | |
| 2020/0004618 A1 | 1/2020 | Thornhill | |
| 2020/0293946 A1* | 9/2020 | Sachan | G06N 20/00 |
| 2021/0239099 A1* | 8/2021 | Mahoney | F03D 7/043 |

OTHER PUBLICATIONS

Koushik Balaji, K., and M. S. Alphin. "Computer-aided human factors analysis of the industrial vehicle driver cabin to improve occupational health." International journal of injury control and safety promotion 23.3 (2016): 240-248. (Year: 2016).*

Mell et al., "The NIST Definition of Cloud Computing", National Institute of Standards and Technology, Special Publication 800-145, Sep. 2011, pp. 1-7.

Pending U.S. Appl. No. 16/794,586, filed Feb. 19, 2020, entitled: "Assigning Operators to Incidents", pp. 1-60.

Ross, et al., "Automatic Resource Assignment for Issue Resolution", Technical Disclosure Commons, Defensive Publication Series, Aug. 30, 2018, pp. 1-7.

* cited by examiner

TRAINING OPERATORS THROUGH CO-ASSIGNMENT

BACKGROUND

The exemplary embodiments relate generally to information technology, and more particularly to an automated co-assignment of a pair of operators to service an incident where a more experienced operator educates a less experienced operator of skills used in resolving the incident.

A client data center that may utilize a cloud and/or hybrid environment may employ a plurality of different types of information technology (IT) services. For proper operation of the client data center, each of the IT services must operate as intended. The monitoring and repair of the IT services in the client data center may be difficult as there may be a plurality of different layers that are involved in providing the IT services. When an incident or failure occurs, the client data center may have one or more teams supporting the IT services where each team may include one or more operators. The teams and any operator assigned to address the incident are required to know that an incident has occurred and need some way of discovering how to diagnose and fix the incident. In resolving the incident, the operator may enter a sequence of commands that may lead to a resolution. However, current approaches may utilize a variety of different factors in determining which team and which operator to be assigned the task of resolving the incident. These approaches are often performed manually by a team leader or administrator of the client data center where the approaches lead to an inefficient approach which is time consuming and prone to error, especially when an initially assigned operator may be ill equipped to handle the incident. Furthermore, even if the proper operator is assigned, current approaches involving assigning the incident to a most qualified operator may provide a short term solution but leads to long term issues. For example, if the data center experiences a relatively large number of incidents that identify a particular operator, this operator may be inundated with assignments. In another example, in assigning incidents to only the most qualified operator, this operator becomes more and more experienced while other operators remain stagnant in their experience with regard to skills that the most qualified operator has.

SUMMARY

The exemplary embodiments disclose a method, a computer program product, and a computer system for co-assigning operators to service an incident with a first operator educating a second operator of skills used in servicing the incident. The method comprises determining a type of incident associated with the incident. The method comprises determining a command group applicable for use based on the type of incident according to a first mapping. The first mapping is indicative of a mapping between the command group and the type of incident based on historical resolutions of historical incidents. The command group includes at least one command used in resolving the type of incident for a historical incident. The method comprises determining the first operator for co-assignment according to a second mapping. The second mapping is indicative of a mapping between the command group and the first operator based on successful historical resolutions of historical incidents by the first operator. The method comprises determining the second operator for the co-assignment according to the second mapping. The second mapping is further indicative of a mapping between the command group and the second operator based on a lack of experience in using the command group. The method comprises co-assigning the incident to the first operator and the second operator.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
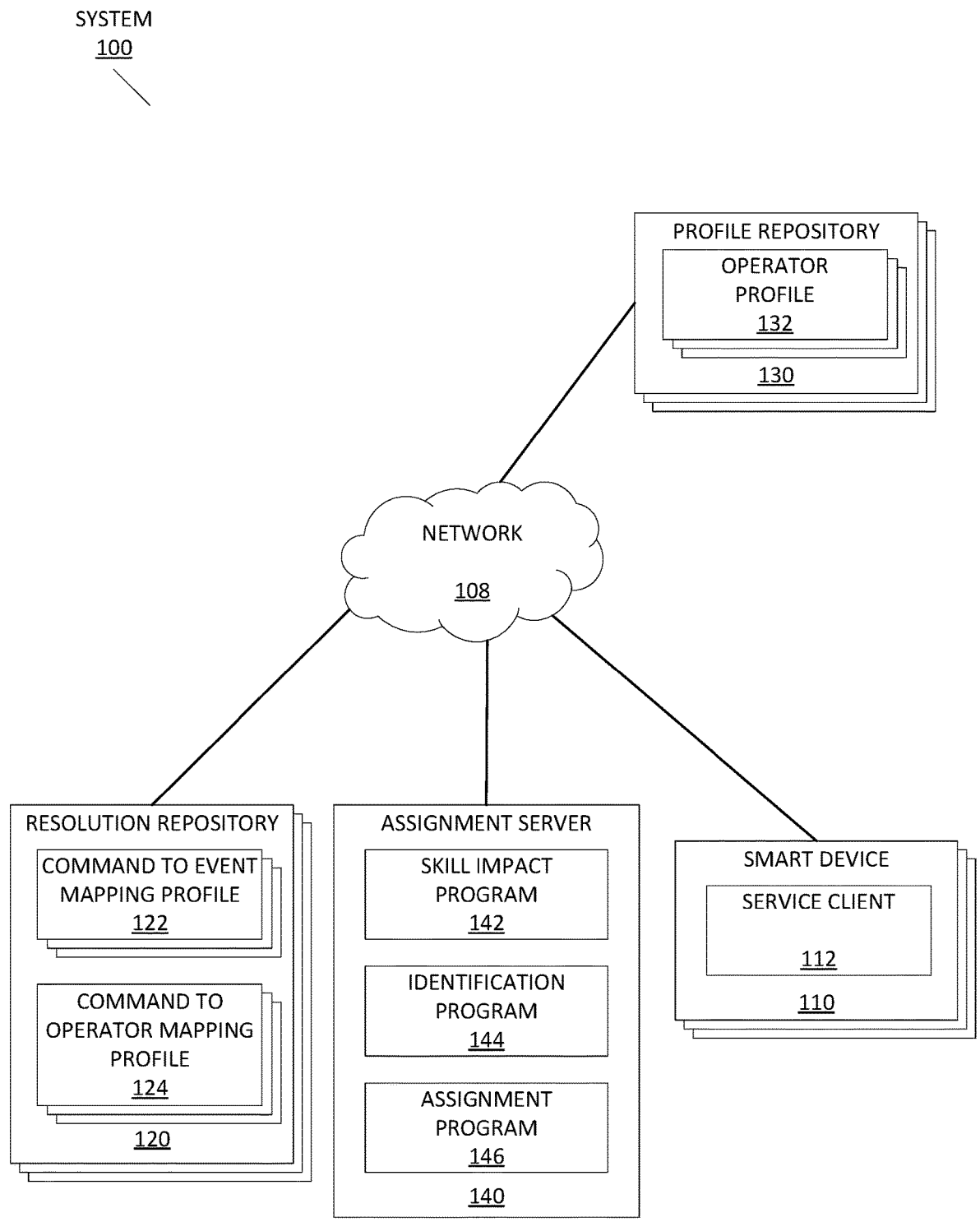
FIG. 1 depicts an exemplary schematic diagram of an incident assignment system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for co-assigning operators to service an incident related to an information technology (IT) service issue arising in a client data center. The co-assigning of the operators may allow for a first operator having more experience and a requisite skillset to resolve the incident to educate a second operator having less experience and a fundamental skillset of the skills used in servicing the incident. As will be described in greater detail herein, the exemplary embodiments are configured to utilize a mapping between operator skill sets and types of incidents through a mapping between command groups of commands used in resolving incidents and the types of incidents that emphasizes when an operator has previously run at least a subset of the command groups required to resolve a type of incident, even in instances where the operator has not specifically resolved the specified type at a previous time. The exemplary embodiments may determine a distribution of skillsets among the operators based on the mapping information. The exemplary embodiments may then determine when and how a new incident is to be assigned one or more operators, particularly when a learning opportunity arises in which the first operator teaches the second operator of the skills used in resolving the new incident. Key benefits of the exemplary embodiments may include a capability for multiple operators to be assigned to resolve an incident at a granular level beyond the level of the event associated with the type of incident where the operator may resolve the incident in a more efficient manner as well as educate a further operator such that this further operator may acquire these skills. Detailed implementation of the exemplary embodiments follows.

Conventional approaches to assigning operators to resolve an incident may utilize a variety of different characteristics of the operators. For example, a conventional approach involves determining an optimal positioning of team members in a shared physical working environment according to which team members most often communicate or collaborate on work items. However, this conventional approach determines which team members are to collaborate based on a shared physical environment or access to a shared instant messaging platform, thereby focusing on optimizing existing collaboration patterns of the team through determining which team members lack skills based on the colleagues with whom is most often communicated and position physically nearby so as to facilitate communication more easily. Such an approach does not determine an importance of each skill to the organization as a whole or optimizing co-assignment to improve domain knowledge shortages within the organization as a whole. In another example, a conventional approach co-assigns mentors and mentees to solve a task and improve the trainee's skill levels but relies on a per-person domain metric for each person in a general pool without determining the importance of each domain to the organization as a whole or optimizing co-assignment to improve domain knowledge shortages within the organization as a whole. In a further example, a conventional approach evaluates reports that have been completed where the reports contain questions that are grouped into different dimensions or categories. This conventional approach scores the responses to determine an overall score that is used to determine if a candidate will be a mentor or a mentee. However, this conventional approach requires reports or surveys to be manually completed by each individual to understand a capability of the individual.

Figure 7:
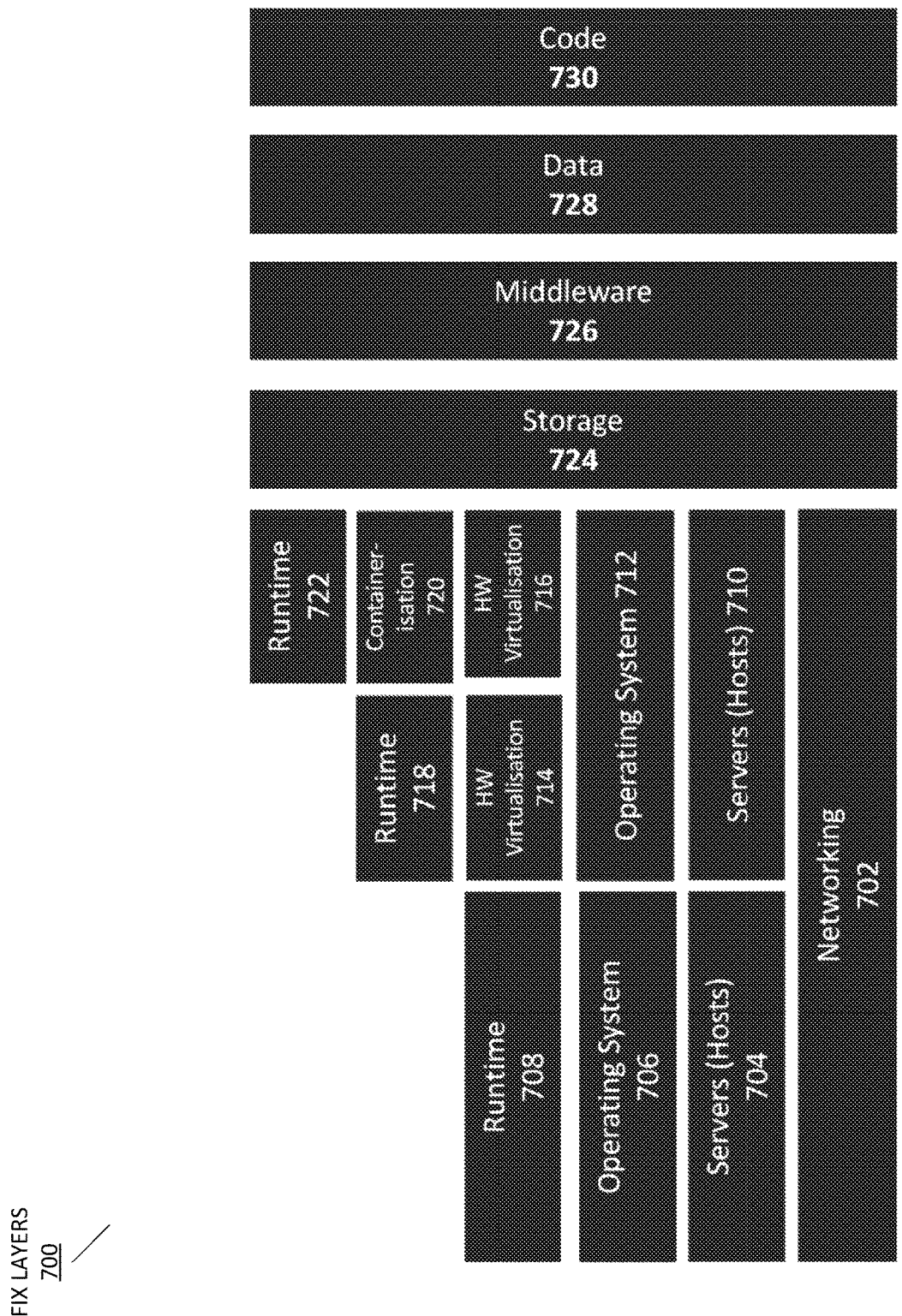
FIG. 7 depicts fix layers, in accordance with the exemplary embodiments.

In contrast to conventional approaches, the exemplary embodiments may consider the various layers involved in providing IT services. For example, the layers may be directed to Code, Data, Runtime, Middleware, Operating System, Virtualization, Servers, Storage, Networking, etc. FIG. 7 depicts fix layers 700, in accordance with the exemplary embodiments. As illustrated, there may be a networking layer 702. As represented, in a first direction (e.g., vertical orientation), a first stack including a plurality of layers may be linked or associated. For example, in the first stack, there may be a first servers layer 704 followed by a first operating system layer 706 followed by a first runtime layer 708. In a parallel manner, in a second stack over the networking layer 702, there may be a second servers layer 710 followed by a second operating system layer 712. Over the second operating system layer 712, there may be a first following stack including a first hardware virtualization layer 714 and a second following stack including a second hardware virtualization layer 716. Over the first hardware virtualization layer 714 may be a second runtime layer 718. Over the second hardware virtualization layer 716 may be a containerization layer 720 followed by a third runtime layer 722. In a second direction (e.g., horizontal orientation), a second stack including a plurality of layers may be linked or associated. For example, in the second stack, there may be a storage layer 724 followed by a middleware layer 726 followed by a data layer 728 followed by a code layer 730. In this manner, according to an exemplary implementation, there may be a plurality of fix layers in which relationships may be identified between skillsets. For example, the networking layer 702 may be relatively close to the servers layers 704 or 710. As will be described below, the exemplary embodiments may map these fix layers and the corresponding commands that may be used in resolving issues linked to these fix layers in determining how to assign an incident that has been identified as including one or more of these fix layers.

Across the many layers, it is key that all required components are operating correctly and that no parts of the system have failed. The exemplary embodiments may utilize an IT Service Management feature that provides a means for support teams to track and assign incidents that may arise. The incidents may be assigned to a member of the support team, known as an operator, who is then responsible for resolving the incident, usually by issuing a sequence of computer commands on the affected systems. In the process of assigning the incident to an operator, the exemplary embodiments provide an automated system capable of tracking which operator is most likely to be able to successfully resolve an incident and automatically assign it to that operator along with a further operator who may learn from the experienced operator. Accordingly, the exemplary embodiments may provide a long term solution in distributing skills across the operators from an experienced operator teaches an inexperienced operator when select skills are identified as only being possessed by a certain number of operators. In this manner, a bottleneck scenario may be avoided where an operator identified as capable of resolving an incident is overburdened with assignments or tickets as other operators may not be able to resolve the incident.

Different operators will obtain different skill sets whilst working as part of an operations team of the client data center. In some cases, there may be a lack of skills in certain areas. Accordingly, some operators who do have the skills in those areas may be assigned these incidents and may develop greater expertise and familiarity in resolving these issues. However, these operators may also become overloaded as more incidents requiring similar skills are assigned to only these operators. In addition, other operators who are determined to not have the skills in those areas may be omitted from consideration which perpetuates their lack of skills and inclusion from being assigned to resolve these incidents. Therefore, in the long term, a solution to always select the most qualified operator may become detrimental as the most skilled operators in a given area become more skilled while the least skilled do not have an opportunity to improve.

The exemplary embodiments provide a mechanism for operators to learn or improve skills from other operators in the team to broaden the skill level on an individual level as well as an overall for the team which increases an efficiency at both levels in resolving incidents. The exemplary embodiments may automatically assign incidents to multiple team members where one member is more skilled or experienced in resolving that incident which involves selected skills and one member requires more skills or training in that area. The exemplary embodiments may utilize an assignment process from calculating a skill level of each operator based on interactions with systems during incident resolution and any other pertinent information that may indicate the skill level of the operator. The skill levels may be used to calculate both an overall skill level of the team in different areas as well as identify which operators may improve their skills and which operators already have a large amount of skill in a given area. Accordingly, where skill levels for a given skill area are low within the team (e.g., only a proportion of team members are skilled in area) or there is a skill area which is in high demand compared with the number of people with that skill, the exemplary embodiments may trigger an automatic assignment process to determine whether a co-assignment of operators to the incident is warranted and subsequently identifying the operators to be co-assigned. The co-assignment of operators to an incident may be used as a teaching or training method by the skilled operator to the less skilled operator such that the less skilled operator learns the skills as taught by the skilled operator. Through the above process, the exemplary embodiments may increase the skill level of the operators individually and as part of the team rather than always having the same operators resolve the same type of incident.

The exemplary embodiments are described with regard to IT services that may be used at a client data center and assignment of incidents for the IT services to operators. However, the exemplary embodiments may be utilized in any environment in which an operator or entity is co-assigned to resolve an incident of any feature for which there is an issue and present a learning opportunity in which a more experienced operator teaches a less experienced operator of the skills used in resolving the incident. The exemplary embodiments are also described with co-assigning an incident in which a more experienced operator having particular skills used in resolving an incident type is paired with a less experienced operator having a base knowledge from which to build. However, the exemplary embodiments may be implemented and/or modified to be used to co-assign an incident to more than two individuals. The less experienced operator may also have no experience and may be trained from a beginner level.

FIG. 1 depicts an incident assignment system 100, in accordance with the exemplary embodiments. According to the exemplary embodiments, the incident assignment system 100 may include one or more smart devices 110, one or more resolution repositories 120, one or more profile repositories 130, and an assignment server 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the incident assignment system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the incident assignment system 100 that do not utilize the network 108.

In the exemplary embodiments, the smart device 110 may include a service client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6. Each of the one or more smart devices 110 may be used by a respective operator having a corresponding operator skill set used in resolving incidents arising at a client data center.

In the exemplary embodiments, the service client 112 may act as a client in a client-server relationship and may be a software, hardware, and/or firmware based application capable of allowing an operator to enter commands used in resolving an incident assigned to the operator via the network 108. For example, the service client 112 may be in a client-server relationship with an IT Service Management system of the client data center. In embodiments, the service client 112 may operate as a user interface allowing the user to enter the commands that affect a platform (not shown) on which the client data center operates as well as interact with one or more components of the incident assignment system 100, and utilize various wired and/or wireless connection protocols for data transmission and exchange associated with cognitively distributing email attachments to recipients, including Bluetooth, 2.4 gHz and 5 gHz internet, near-field communication, Z-Wave, Zigbee, etc.

Upon being assigned an incident (e.g., received as a ticket from a user who notices an issue while using the IT services, as determined from running tests or maintenance operations, etc.), the user may utilize the service client 112 to enter commands that attempt to resolve the incident. For example, the commands may be computer commands that control a manner in which the system, the constituent fix layers, etc. associated with the IT services operate. The computer commands may be directed to a specific fix layer. The computer commands may also be specific to a component, a platform, etc. on which the IT service is provided. The operator may utilize a plurality of different commands that may or may not resolve the incident.

In the exemplary embodiments, the resolution repository 120 may include one or more command to event (C2E) mapping profiles 122 and one or more command to operator (C2O) mapping profiles 124 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the resolution repository 120 is shown as a single device, in other embodiments, the resolution repository 120 may be comprised of a cluster or plurality of electronic devices, in a modular manner, etc., working together or working independently. While the resolution repository 120 is also shown as a separate component, in other embodiments, the resolution repository 120 may be incorporated with one or more of the other components of the incident assignment system 100. For example, the resolution repository 120 may be incorporated in the assignment server 140. Thus, access to the resolution repository 120 by the assignment server 140 may be performed locally. The resolution repository 120 is described in greater detail as a hardware implementation with reference to FIG. 4, as part of a cloud implementation with reference to FIG. 5, and/or as utilizing functional abstraction layers for processing with reference to FIG. 6.

The C2E mapping profiles 122 and the C2O mapping profiles 124 may be generated based on historical information related to commands used in resolving previously addressed incidents, information related to operators assigned to previously addressed incidents as well as any commands that were respectively entered, and any other historical information that may be related to previously addressed incidents. By monitoring incidents being resolved as the operator is entering commands via the service client 112, the corresponding data associated with resolution of incidents may be stored. For example, the resolution repository 120 may include historical information of previous incidents (not shown) at the client data center. The resolution repository 120 may include historical information of incidents that may occur outside the client data center. The data may be stored with various associated information including, for example, the type of incident, a timestamp of when the incident occurred, a timestamp of when the incident was resolved, any operator assigned to service the incident, the commands entered by each operator assigned to service the incident, a fix layer on which the incident is associated, etc.

According to an exemplary implementation, the incident assignment system 100 may include an incident management application (not shown) that monitors the operators utilizing the service client 112 in entering terminal commands to fix incidents. According to an exemplary embodiment, the operators may have access to runbooks that list a set of commands to be used for a given type of incident. Thus, the runbooks may provide instructions to operators in handling future incidents that are substantially similar to incidents that are resolved at a previous time. The exemplary embodiments may be directed toward incidents in which there is no runbook available. Thus, the incident management application of the skill impact program 142 may monitor events that do not have an associated runbook. In monitoring these incidents, the skill impact program 142 may identify and capture the commands entered by the operator and store the commands in a reference for the incident alongside other pertinent information. The other pertinent information may include an identity of the operator, a type of the incident, the time taken to enter the commands, a flag to indicate a success or failure of each command, a fix layer involved in the incident, an identity of the manufacturer of hardware and/or software components of the incident, etc.

Based on the information that is received regarding historical incidents and all associated data, common command groups across the historical incidents based on the commands used for the historical incidents may be identified and categorized. Each command group may represent a set of commands that affect a certain technology stack and/or knowledge area that is associated with the incidents. For example, a command group may be commands that target a specific manufacturer of router while another command group may target a certain vendor's cloud platform. The commands may be grouped into command groups based on a variety of factors (e.g., hard coded command sets, common occurrence above a predetermined frequency, text that is above a predetermined similarity metric, measuring an effect of running commands and determining the commands that have a result within a further predetermined similarity metric, parsing pages, product documentation, etc., manual determination, etc.).

Using the command groups, the C2E profiles 122 may be generated by mapping incident types to command groups. The command groups may be mapped to the incident types where the command groups have been used to resolve historical incidents. For example, a command group may have been discovered that restarts an application on a specific cloud platform for which an incident has arisen. The commands in the command group may have been used in the past by one or more operators to resolve an incident involving the application being unresponsive. Through this linking between command groups and incident types, the C2E profiles 122 may be generated as a many to many mapping between command groups and incident types where the same command group may be used to resolve one or more incident types and one incident type may be resolved by one or more command groups.

Using the command groups, the C2O profiles 124 may also be generated by mapping operators to command groups. As described above, the operator that entered the commands during resolution of historical incidents may be recorded along with the commands that were entered. Based on this information, a mapping between the operators who have previously executed each group of commands may be generated. Through this linking between operators and command groups, the C2O profiles 124 may be generated as a many to many mapping between operators and command groups where a single operator may likely have used a plurality of command groups to resolve incidents in the past and multiple operators may have independently used the same group of command groups to resolve different types of incidents.

Through the above processes, the resolution of incidents that are reported for the client data center may be monitored and the operators who are entering commands, the commands that are being entered, the incident types for the various incidents, etc. may be recorded. Based on this information, the C2E mapping profiles 122 and the C2O mapping profiles 124 may be created.

In the exemplary embodiments, the profile repository 130 may include one or more operator profiles 132 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 130 is shown as a single device, in other embodiments, the profile repository 130 may be comprised of a cluster or plurality of electronic devices, in a modular manner, etc., working together or working independently. While the profile repository 130 is also shown as a separate component, in other embodiments, the profile repository 130 may be incorporated with one or more of the other components of the incident assignment system 100. For example, the operator profiles 132 represented in the profile repository 130 may be incorporated in respective ones of the smart device 110 (e.g., each smart device 110 has a profile repository 130 including at least the operator profile 132 of the operator who is respectively associated). Thus, access to the profile repository 130 and to a specific one of the operator profiles 132 may be performed through a transmission from the smart device 110. The profile repository 130 is described in greater detail as a hardware implementation with reference to FIG. 4, as part of a cloud implementation with reference to FIG. 5, and/or as utilizing functional abstraction layers for processing with reference to FIG. 6.

The operator profiles 132 may include various information that may be used in determining a skill level of an operator. For example, based on the C2E mapping profiles 122 and the C2O mapping profiles 124, the operator profiles 132 may be generated to indicate the types of command groups and the types of incidents that the operator has previously used and been assigned, respectively. With the C2E mapping profiles 122 and the C2O mapping profiles 124 providing the links between operator, incident, and command group, the operator profiles 132 may be a reorganization of the information from the perspective of the individual operator. The operator profiles 132 may include further information such as a job title, a department in which the user or recipient belongs, a current status (e.g., active, inactive, prospective, retired, etc.), responsibilities of the job position, projects on which the user and/or recipients are a part currently and/or historically, etc. In another example, the operator profiles 132 may include information indicative of expertise, knowledge, coursework, interest, etc. in various fields. The technical expertise may be, for example, a technical discipline, a scientific practice, etc.

In the exemplary embodiments, the assignment server 140 may include a skill impact program 142, an identification program 144, and an assignment program 146 and act as a server in a client-server relationship with the service client 112 as well as be in a communicative relationship with the resolution repository 120 and the profile repository 130. The assignment server 140 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the assignment server 140 is shown as a single device, in other embodiments, the assignment server 140 may be comprised of a cluster or plurality of computing devices, working together or working independently. While the assignment server 140 is also shown as a separate component, in other embodiments, the operations and features of the assignment server 140 may be incorporated with one or more of the other components of the incident assignment system 100. For example, the operations and features of the assignment server 140 may be incorporated in the smart device 110, particularly the smart device 110 of the operator who is resolving an incident. The assignment server 140 is described in greater detail as a hardware implementation with reference to FIG. 4, as part of a cloud implementation with reference to FIG. 5, and/or as utilizing functional abstraction layers for processing with reference to FIG. 6.

The assignment server 140 is configured to strategically assign incidents not only to the most experienced operators but also to operators who need to improve their skills in certain areas. Accordingly, the assignment server 1240 may prevent situations where the most experienced operators become more experienced while the least experienced never have an opportunity to learn.

In the exemplary embodiments, the skill impact program 142 may be a software, hardware, and/or firmware application configured to determine a skill impact metric that indicates a measure of which areas have a largest shortage of skills or indicates a need for more operators to have certain skills. The skill impact program 142 may utilize the mapping between events and command groups as described in the C2E mapping profiles 122 where each command group maps to a certain skill.

According to an exemplary implementation, the skill impact program 142 may perform a set of operations to determine the skill impact metric. For example, the skill impact program 142 may determine a skill demand by finding the number of incidents that have required each skill or command group in a past predetermined number of periods. The predetermined number of periods may be selected manually, based on historical analyses that provided insight as to the skill impact metric, etc. The incidents may be weighted such that more recent events have a larger impact. This may produce a mapping between each skill or command group with a weighted demand factor.

In an exemplary manner of weighting the more recent incidents, the skill impact program 142 may incorporate a variety of different variables. Before describing the process of the weighting, select variables are described below.

$$F_t^{(O)} = \frac{W n_{st}}{N_{st}} + (1-W)\left(1 - \frac{n_{ft}}{N_{ft}}\right) \quad \text{(Equation 1)}$$

$$S_0^{(O)} = F_0^{(O)} \quad \text{(Equation 2)}$$

$$S_t^{(O)} = \alpha F_t^{(O)} + (1-\alpha) s_{t-1}^{(O)} \quad \text{(Equation 3)}$$

$$D_0 = N_0 \quad \text{(Equation 4)}$$

In Equation 1, $F_t$ may represent a success factor a time window t for operator O, W may represent a success of failure weighting factor set between 0 and 1 (e.g., may be set to 0.7 which indicates a success is weighted slightly higher than a failure), $n_{st}$ may represent a number of successes at time window t for a selected operator, $N_{st}$ may represent a number of successes at time window t for all operators, $n_{ft}$ may represent a number of failures at time window t for a selected operator, and $N_{ft}$ may represent a number of failures at time window t for all operators. In Equation 2, so may represent a time-weighted success factor at time 0 for operator O and $F_0$ may represent a success factor at time 0 for operator O. In Equation 3, $s_t$ may represent a time-weighted success factor at time t for operator O where t=now produces a current time-weighted success factor for the operator between 0 (e.g., representing inexperienced with no knowledge or skill in the area) to 1 (e.g., representing experienced with full knowledge or skill in the area), a represents a smoothing factor between 0 and 1 that determines how much older factors contribute to the overall success factor, and $F_t$ represents a success factor at time window t for operator O. In Equation 4, $D_0$ represents a skill demand at time 0 and $N_0$ represents a number of attempts at time 0 for all operators.

Based on the above, the skill impact program 142 may weight more recent incidents to have a larger impact using the following:

$$D_t = \alpha N_t + (1-\alpha) N_{t-1} \quad \text{(Equation 5)}$$

where $D_c$ represents a skill demand at time t which is a weighted moving average of a number of attempts and $N_t$ and $N_{t-1}$ represent a number of attempts at time window t and t-1, respectively, for all operators. Those skilled in the art will understand how the above variables and factors may be incorporated into Equation 5 to determine the weighting applied for more recent incidents which results in a demand factor.

The skill impact program 142 may use the mapping between skills or command groups with the operators who have successfully used the command groups as indicated in the C2O mapping profiles 124 to determine a global skill factor across all operators for each skill or command group. For example, the skill impact program 142 may determine the global skill factor using the following:

$$S_t = \Sigma_{o=0}^{N_o} s_t^{(o)} \quad \text{(Equation 6)}$$

where $S_t$ represents a global time-weighted success factor across all operators and $N_o$ represents a number of operators. Those skilled in the art will understand how the above variables and factors may be incorporated into Equation 6 to determine the global skill factor where the global skill factor represents how skilled the operations team as a whole including operators is for each skill or command group.

The skill impact program 142 may again use the mapping between skills or command groups with the operators as indicated in the C2O mapping profiles 124 to determine a distribution of each skill or command group across the operator population. For example, the skill impact program 142 may determine a skill distribution factor using the following:

$$\sigma(s_t) = \sqrt{\frac{1}{N_o}\sum_{o=0}^{N_o}(S_t^{(o)} - \mu(s_t))^2} \quad \text{(Equation 7)}$$

where $\sigma(s_t)$ represents a standard deviation of operator success factors (e.g., how well a skill or command group is distributed across the population of operators where a lower value indicates a better standard) and $\mu(s_t)$ represents a mean operator success factor at time t. Those skilled in the art will understand how the above variables and factors may be incorporated into Equation 7 to determine the skill distribution factor where the skill distribution factor represents where skills or command groups are unevenly distributed across the population of operators.

The skill impact program 142 may determine the skill impact metric by incorporating the demand factor, the global skill factor, and the skill distribution factor. The skill impact metric may indicate a utility value regarding whether to train one or more operators in a given skill or command group. According to an exemplary implementation, the utility value may be measured against a training threshold in which the utility value being at least the training threshold may indicate that the incident assignment system 100 is to co-assign operators to an incident. As a result of the utility value being less than the training threshold, the incident assignment system 100 may determine that co-assignment of operators may be inefficient, have more cost than benefit, etc. such that a single operator may instead be assigned. In another exemplary implementation, the skill impact program 142 may rank the skills or command groups based on the corresponding utility values. In this manner, the skill impact metric for each skill or command group known to the system may be ordered according to impact such that the ranked list may determine when to attempt to increase the skills of operators through co-assignment of incidents. For example, based on the number of items in the ranked list, the items that are above a median may utilize a co-assignment of operators.

The client data center may include a system in which incidents may be reported. For example, a user of the client data center may be utilizing various features. In using one of the features, the user may determine an incident by recognizing that the feature is not operating as intended. The user may fill out a ticket and submit the ticket to an administrative system that resolves such incidents. In another example, the client data center may be performing scheduled or routine maintenance on the various features and operations of the client data center. The results of the maintenance may identify incidents that may have arisen. These incidents may be collected and submitted to the administrative system.

When a new incident is reported, the assignment server 140 may perform further operations to assign an operator or co-assign operators to the incident. In the exemplary embodiments, the identification program 144 may be a software, hardware, and/or firmware application configured to identify operators who may be capable of resolving the new incident. The identification program 144 may have access to the C2E mapping profiles 122 and the C2O mapping profiles 124 in the resolution repository 120, the operator profiles 132 in the profile repository 130, and the results determined by the skill impact program 142. Using the above noted data along with information of the new incident, the identification program 144 may determine one or more operators who may be equipped with the skill set necessary to resolve the new incident as well as one or more operators, when warranted, who may benefit from being co-assigned to learn the skill set used to resolve the new incident.

The identification program 144 may be configured to determine a type of the incident. For example, based on information included in a ticket for the incident, manually entered information regarding the incident, etc., the identification program 144 may identify the type of incident including one or more fix layers that the incident resides, an identification of hardware and/or software components involved with the incident, etc. By determining the type of incident, the identification program 144 may perform subsequent operations in assigning the new incident to one or more operators.

The identification program 144 may also be configured to receive information regarding the type of incident. For example, the client data center may include an administrative system or management system that is configured to identify the type of incident. The identification program 144 may receive the type of incident to perform the subsequent operations. Those skilled in the art will understand that there may be a variety of different mechanisms that may be used in identifying the type of incident that the new incident may be. The assignment server 140 may be configured to incorporate any of these mechanisms within the scope of the exemplary embodiments.

Based on the type of incident, the identification program 144 may utilize the C2E mapping profiles 122 to determine the command groups that are applicable to the type of incident. Based on the many to many mapping that the C2E mapping profiles 122 may indicate, the identification program 144 may determine the one or more command groups that may be involved in resolving the new incident based on historical resolutions of incidents that may be related to the type of incident. The identification program 144 may utilize the C2O mapping profiles 124 to determine which operators have used the command groups determined based on the type of incident and the C2E mapping profiles 122. In an exemplary embodiment, the identification program 144 may generate a list of operators who have successfully used the identified command groups (e.g., based on the type of incident via the C2E mapping profiles 122) in resolving previous incidents. The identification program 144 may utilize other information that may be pertinent in determining operators who may be equipped to resolve the new incident. For example, the identification program 144 may have access to the operator profiles 132 stored in the profile repository 130. The identification program 144 may further be configured to rank or order the operators who have the skills in the command groups based on experience. Thus, the identification program 144 may rank these operators with a highest ranked operator having the most experience or knowledge of the command groups and a lowest ranked operator has the least experience or knowledge of the command groups but in a sufficient degree where the lowest ranked operator may still be assigned to the incident.

Based on the type of incident and the associated command groups, the identification program 144 may also the C2O mapping profiles 124 to determine which operators may not be skilled in the command groups. For example, an operator may not have any experience with the skills in the command groups. In another example, an operator may have only studied the skills without applying the knowledge to an actual incident. In an exemplary embodiment, the identification program 144 may generate a list of operators who may benefit from being co-assigned to an incident involving the identified command groups to learn the skills from a more experienced operator. Again, the identification program 144 may utilize other information that may be pertinent in determining operators who may be equipped to resolve the new incident. For example, the identification program 144 may have access to the operator profiles 132 stored in the profile repository 130. In this manner, the identification program 144 may identify operators who have a baseline or fundamental knowledge related to the skills in the command groups. Accordingly, the identification program 144 may only identify those operators for whom the co-assignment will serve a purpose of equipping those operators to build upon their skill set (e.g., in contrast to merely identifying any operator who may be in a different department unrelated to the skills of the command groups). The identification program 144 may further be configured to rank or order the operators who lack the skills in the command groups based on experience or knowledge. Thus, the identification program 144 may rank these operators with a highest ranked operator having the most experience or knowledge of the command groups but in an insufficient degree where the highest ranked operator may not be assigned to the incident and a lowest ranked operator has the least experience or knowledge of the command groups.

In the exemplary embodiments, the assignment program 146 may be a software, hardware, and/or firmware application configured to receive the list of experienced operators and the list of inexperienced operators identified by the identification program 144, the ranking of the experienced and inexperienced operators determined by the identification program 144, and the results of the skill impact program 142 to determine which of the operators is to be assigned in resolving the new incident and to determine whether to co-assign operators to the new incident as well as which operators who are co-assigned.

According to an exemplary implementation, when a new incident is identified or correlated group of events occurs, the assignment program 146 may determine the optimal operators to assign to work on the incident for resolution, for teaching, and/or for learning. Based on the information received from the identification program 144, the assignment program 146 may be aware of the command groups and/or skills that may be required in resolving the new incident (e.g., based on the mapping indicated in the C2E mapping profiles 122).

Using the ranked list of impactful skills as determined by the skill impact program 142 using the skill impact metric, the assignment program 146 may determine if the incident requires skills that are weighted highly in the list. As described above, the assignment program 146 may determine if the incident is to be assigned to an operator or co-assigned to multiple operators based on a training threshold, based on a number in a ranked list, etc. In the case where the incident does not require impactful skills to resolve, the assignment program 146 may determine which operator is the most experienced for the areas using operator skill factors as indicated in the operator profiles 132 and the C2O mapping profile 124. In the case where the incident does require impactful skills to resolve, the assignment program 146 may determine which operators are the most and least skilled or experienced for the areas using the operator skill factors. For example, the assignment program 146 may utilize the ordered list of experienced operators (e.g., select the highest ranked experienced operator) and the ordered list of inexperienced operators (e.g., select the lowest ranked inexperienced operator). When co-assigning, the assignment program 146 may co-assign the operator who is the most inexperienced with the operator who is the most experienced to enable the two operators to work together to resolve the issue. This co-assignment may allow the more experienced operator to train the less experienced operator during the process of resolution.

The assignment program 146 may also determine an availability of the selected highest ranking experienced operator and the lowest ranking inexperienced operator. For example, based on the information of the operator profile for the highest ranking experienced operator and the lowest ranking inexperienced operator, the assignment program 146 may determine an availability to resolve the new incident. As a result of the highest ranking experienced operator and/or the lowest ranking inexperienced operator being unavailable (e.g., on vacation, out of office, suspended status, etc.), the assignment program 146 may remove the corresponding operator from the list of identified operators for the new incident and select a next highest ranking experienced operator or a next lowest ranking inexperienced operator. The assignment program 146 may continue this process until an available experienced and/or inexperienced operator is selected. The assignment program 146 may also determine a relative urgency of the new incident. For example, if the new incident has a relatively high urgency, the assignment program 146 may perform the availability analysis described above. However, if the new incident has a relatively low urgency where a waiting time to resolve the new incident is available, the assignment program 146 may determine whether the highest ranking experienced operator may be assigned the new incident given the waiting time, particularly when the highest ranking experienced operator is not currently available. Through this process, the assignment program 146 may identify the highest ranking experienced operator as well as the lowest ranking inexperienced operator and assign the new incident to the these operators for subsequent resolution to maximize the teaching/learning dynamic in propagating the skills to the inexperienced operators.

Through the manner described above, the assignment server 140 according to the exemplary embodiments is configured to select an operator for assignment to a new incident with an increased probability of efficient resolution as well as providing a learning experience for the inexperienced operator. Since the selection of the operator as determined to be the highest ranked is based on previous successes from using a command group that affects the type of incident that the new incident is directed, the exemplary embodiments may assign the new incident to the operator who is already familiar with the commands that may be used in resolving the new incident. As such, the inexperience operator who is co-assigned may observe or be taught the skills used in resolving the type of incident.

The assignment server 140 may include a plurality of features that may be used in optimizing the manner in which to determine the operators who are co-assigned to the incident based on various other metrics. For example, the assignment server 140 may utilize a learning score that describes a metric describing how successful an operator has been in the past at learning skills from more experienced operators. The assignment server 140 may determine the learning score with the following:

$$LS_o = \Sigma_{t=C_0}^{|C|}(N_{SSt}^o - N_{fst}^o)/(N_{sbt}^o - N_{fbt}^o) \quad \text{(Equation 8)}$$

where $LS_o$ represents a metric estimating an operator's capability of learning skills, C is a set of all co-assignment times, $N_{sst}$ represents a number of operator successes since time t, $N_{fst}$ represents a number of operator failures since time t, $N_{sbt}$ represents a number of operator successes before time t, and $N_{fbt}$ represents a number of operator failures before time t. Those skilled in the art will understand how the above variables and factors may be incorporated into Equation 8 to determine the learning score of a selected operator based on historical learning sessions with experienced operators.

In another example, the assignment server 140 may utilize a teaching score that describes a metric describing how successful an operator has been in the past at teaching skills to less experienced operators. The assignment server 140 may determine the teaching score with the following:

$$TS_o = \frac{1}{O}\sum_{o=0}^{O} LS_o \quad \text{(Equation 9)}$$

where $T_{so}$ represents a metric estimating operator capability of teaching skills. Those skilled in the art will understand how the above variables and factors may be incorporated into Equation 9 to determine the teaching score of a selected operator based on historical teaching sessions with less experienced operators.

In a further example, the assignment server 140 may utilize an operator workload score that describes a metric describing the utilization of each operator as a combination of a number of assigned incidents and a number of other operators the operator has recently trained. The assignment server 140 may determine the operator workload score with the following:

$$U_o = \frac{t_w(N_{oc})}{\max_{op \in O} N_{oc}} + \frac{a_w(N_{at}^o)}{\max_{op \in O} N_{at}^{op}} \quad \text{(Equation 10)}$$

where $U_o$ represents a metric estimating operator utilization, $t_w$ represents a training weight, $a_w$ represents an assignment weight, and $N_{oc}$ represents a number of operator co-assignments. Those skilled in the art will understand how the above variables and factors may be incorporated into Equation 10 to determine the operator workload score of a selected operator based on assigned incidents and training sessions.

In using the learning score, the teaching score, the operator workload score, or a combination thereof, the assignment program 144 update the assignment process to further consider these metrics and attempt to co-assign incidents to the best learners and best teachers rather than based on a strict knowledge standard. This incorporation of these further metrics may also minimize overloading particular operators.

The assignment program 144 may utilize additional optimizations that maybe performed using one or more of the above described metrics. For example, for operators who have a lower learning score (e.g., below a predetermined threshold), the assignment program 144 enable these operators to be flagged so that alternative teaching mechanisms of training or alternative teachers may be selected. If the above process were strictly followed, operators having relatively low or the lowest learning score may be denied any opportunity to be co-assigned and learn. Accordingly, this optimization may compensate for such operators and provide at least some opportunity to also learn more skills.

The resolution of incidents from co-assigning multiple operators may be performed in a variety of different manners. For example, the operators may be co-located and use a common service client 112 for an in-person teaching lesson. In this manner, the less experienced operator may observe the process by which the more experienced operator uses in resolving the incident. In another example, the operators may utilize any telecommunications means such as a text based messaging application, a voice application, a video application, etc. where the fixing of an incident is carried out within a collaboration tool. The incident may be passed into the collaboration tool using an application programming interface (API) and the more experienced operator acting as the teacher and the less experienced operator acting as the student may be added as part of the collaboration. The teacher may teach the student on how to resolve the incident and emphasize key materials as required. The collaboration may be extended to other learners to show the steps that are used. For example, operators who were not selected based on the above criteria may still wish to learn how to resolve the incident. These operators may audit the session between the selected operators. On completion of the incident being resolved, updates may be made to the operators' respective skill (e.g., the more experienced operator may be updated with regard to the teaching score, the less experienced operator may be updated with regard to learning score and skill set, etc.).

In addition to co-assigning incidents to multiple operators to increase the skill set of the group of operators selected for learning, the assignment server 140 may be configured to use similar techniques to highlight what skilled operators have done to resolve incidents in the past to less skilled operators. In this case, incidents may be assigned only to the less skilled operator but the sequence of commands used by the more skilled operator and any additional notes where applicable may be presented to the selected operator.

Figure 2:
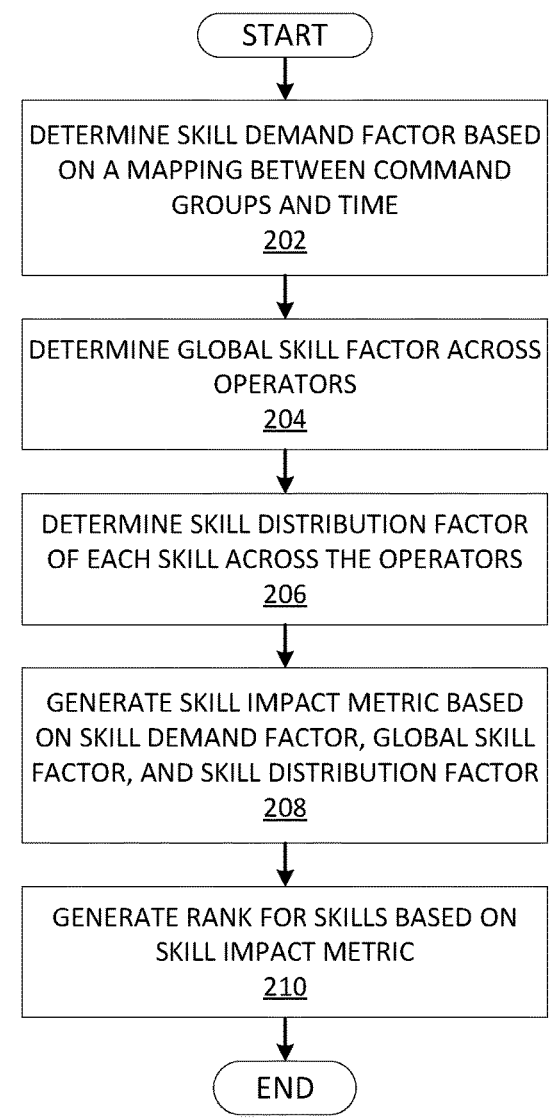
FIG. 2 depicts an exemplary flowchart of a method illustrating the operations of an assignment server 140 of the incident assignment system 100 in determining a skill impact factor used in determining co-assignment of incidents, in accordance with the exemplary embodiments.

FIG. 2 illustrates an exemplary flowchart of a method 200 illustrating the operations of the skill impact program 142 of the assignment server 140 of the incident assignment system 100 in determining a skill impact factor used in determining co-assignment of incidents, in accordance with the exemplary embodiments. The method 300 may relate to operations that are performed by the skill impact program 142 to rank skills to determine when to attempt to increase the skills of the operators. The method 200 will be described from the perspective of the assignment server 140.

The method 200 may assume that the C2E mapping profiles 122 and the C2O mapping profiles 124 have already been generated and available for use by the skill impact program 142. For example, the incident assignment system 100 or another system may be configured to monitor historical incidents prior to a current time to record data that is used in generating the C2E mapping profiles 122 and the C2O mapping profiles 124.

The assignment server 140 may determine a skill demand factor based on a mapping between command groups and time (step 202). The skill demand factor may be a mapping between each skill or command group to a weighted demand factor for the skill or command group. In determining the skill demand factor, the assignment server 140 may determine a number of incidents that have required a selected skill or command group in a prior predetermined number of time periods. In an exemplary implementation, the assignment server 140 may determine the skill demand factor at a selected time based on a number of attempts at a time window for all operators and a number of attempts a previous time window for all operators, each of the number of attempts being modified using a smoothing factor.

The assignment server 140 may determine a global skill factor across all operators (step 204). The global skill factor may be based on a mapping between skills or command groups and operators who have successfully used those command groups in resolving historical incidents. Thus, the global skill factor may be across all operators for each skill or command group. In an exemplary implementation, the assignment server 140 may determine the global skill factor as a global time-weighted success factor across all operators based on a time-weighted success factor at a selected time with a current time producing a current time-weighted success factor for the operator (e.g., valued between 0 and 1 where 0 represents inexperienced and 1 represents experienced).

The assignment server 140 may determine a skill distribution factor of each skill across the operators (step 206). The skill distribution factor may be based on a mapping between skills or command groups and operators that is directed to where skills may be unevenly distributed across the population of operators. In an exemplary implementation, the assignment server 140 may determine the skill distribution factor as a standard deviation of operator success factors based on a number of operators, a global time-weighted success factor across all operators and a mean operator success factor at a selected time as a function of the time-weighted success factor at the selected time.

The assignment server 140 may generate the skill impact metric based on the skill demand factor, the global skill factor, and the skill distribution factor (step 208). According to an exemplary implementation, the assignment server may combine the skill demand factor, the global skill factor, and the skill distribution factor to generate the skill impact metric. The skill impact metric may describe how useful the training of an operator in a given skill may be.

The assignment server 140 may generate a rank for the skills or command groups based on the skill impact metric (step 210). The assignment server 140 may rank the command groups based on the skill impact metric such that an identification of the requirement of a command group may indicate whether a co-assignment is to be used. The assignment server 140 may rank the command groups based on a variety of manners. For example, the assignment server 140 may rank the command groups that have a skill impact metric above a training threshold to hold a first rank indicative of warranting a co-assignment to the incident. The assignment server 140 may rank other command groups that have a skill impact metric below the training threshold to hold a second rank indicative of omitting a co-assignment to the incident. In another example, the assignment server 140 may rank the command groups in an ordered list such that the command groups above a predetermined threshold (e.g., a median value of a total number of command groups) are considered appropriate for using a co-assignment.

The method 200 may include further operations that may be performed based on the skill impact metric and the factors that are used in generating the skill impact metric. For example, the assignment server 140 may further identify the operators who have sufficient experience for a selected command group and other operators who do not where the sufficient experience is a level where the operator may be assigned to resolve an incident involving the command group. The other operators who do not have the sufficient experience may be filtered to only include operators having a minimum amount of experience in a field related to the command group. The experienced operators may be ranked from most experienced to least experienced where all operators in this group are capable of resolving an incident that utilizes the selected command group. The inexperienced operators may also be ranked from most experienced to least experienced where all operators in this group are not likely capable of resolving an incident that utilizes the selected command group or otherwise requires further training with the command group.

To further illustrate the operations of the assignment server 140, reference is now made to an illustrative exemplary embodiment. According to the illustrative exemplary embodiment, there may be an operations team including ten operators. Across the ten operators, there may be twenty different command groups that the operations team may be capable of handling. Based on the individual capabilities of the operators and considering the operations team as a whole, the assignment server 140 may order the twenty command groups where a highest ranking command group has a highest skill impact metric (e.g., co-assignment is likely) and a lowest ranking command group has a lowest skill impact metric (e.g., co-assignment is unlikely). To maintain a skilled corps of operators on the operations team, the assignment server 140 may utilize a mean value of the total number of command groups to determine when to warrant co-assignment of an incident involving a corresponding command group. Thus, the top ten command groups may be identified as the command groups that will issue co-assignments while the remaining command groups may be assigned to individual operators. On an individual operator level, only select operators may be experienced to a level where assignment to an incident involving identified command groups may be warranted. Therefore, for each command group, the assignment server 140 may rank the operators from a most experience to a least experienced and determine which of the operators may be assigned to resolve an incident involving a selected command group and which operators may not be assigned. The assignment server 140 may thereby create two groups of operators which are ranked based on experience with regard to the selected command group.

Figure 3:
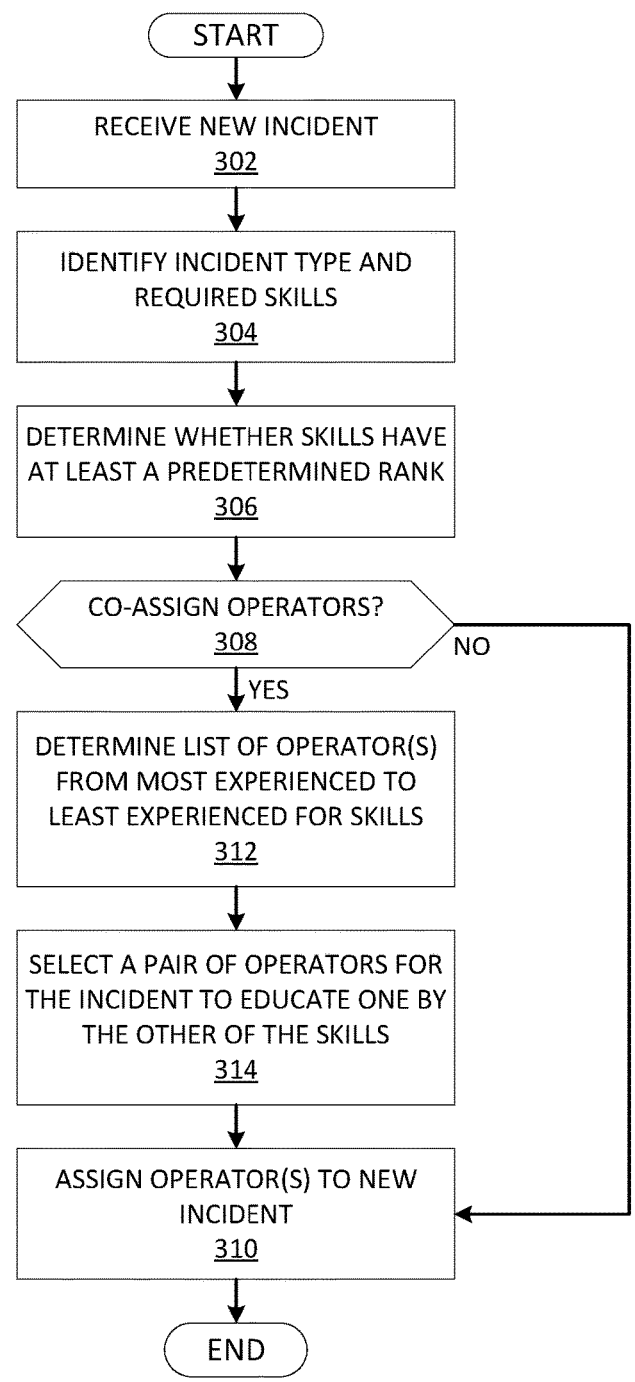
FIG. 3 depicts an exemplary flowchart of a method illustrating the operations of the assignment server 140 of the incident assignment system 100 in assigning one or more operators to service an incident, in accordance with the exemplary embodiments.

FIG. 3 depicts an exemplary flowchart of a method 300 illustrating the operations of the identification program 144 and the assignment program 436 of the assignment server 140 of the incident assignment system 100 in assigning one or more operators to service an incident, in accordance with the exemplary embodiments. The method 300 may relate to operations that are performed by the identification program 144 and the assignment program 146 to determine when and how a plurality of operators are to be co-assigned an incident so that a first operator educates a second operator of skills used in resolving the incident. The method 300 will be described from the perspective of the assignment server 140.

The method 300 may also assume that the C2E mapping profiles 122 and the C2O mapping profiles 124 have already been generated and available for use by the skill impact program 142. For example, the incident assignment system 100 or another system may be configured to monitor historical incidents prior to a current time to record data that is used in generating the C2E mapping profiles 122 and the C2O mapping profiles 124.

The assignment server 140 may receive a new incident (step 302). The new incident may have occurred at a designated time (e.g., a current time). The new incident may be reported in a variety of reporting mechanisms (e.g., via a ticket from a user who noticed the incident, via a maintenance check of the system, etc.). Upon receiving the new incident, the assignment server 140 may identify the type of incident for the new incident as well as determine the skills or command groups that may be used in resolving the type of incident (step 304).

Upon identifying the command groups that may be required for the type of incident that the new incident is associated, the assignment server 140 may determine whether the command groups or skills have a skill impact metric that satisfies a training threshold (step 306). As described above, the training threshold may be applied in a variety of different ways. For example, as a result of the command group of the new incident corresponding to a command group that is ranked among the other command groups, the assignment server 140 may determine whether the ranking satisfies the training threshold. Based on this determination, the assignment server 140 may determine whether the command group warrants co-assigning operators such that a first operator teaches a second operator of the skills in the command group to resolve the incident (decision 308).

As a result of the assignment server 140 determining that the command group does not warrant co-assignment (decision 308, "NO" branch), the assignment server 140 may assign the most experienced and available operator with the requisite skill set to resolve the new incident (step 310). For example, the assignment server 140 may identify the most experienced operator based on the operator profiles 132 and/or analyzing the C2E mapping profiles 122 and the C2O mapping profiles 124.

As a result of the assignment server 140 determining that the command group may warrant co-assignment (decision 308, "YES" branch), the assignment server 140 may select an experienced operator and an inexperienced operator to be co-assigned to the new incident such that the inexperienced operator may learn the skills to resolve the new incident from the experienced operator. In selecting the operators to be co-assigned, the assignment server 140 may determine a list of experienced operators who have a high likelihood of being capable of resolving the new incident and a list of inexperienced operators who are incapable of resolving the new incident (step 312). Each list may be ordered from most experience to least from among the experienced operators and from among the inexperienced operators. Based on the lists, the assignment server 140 may select an operator from the experienced operators and an operator from the inexperienced operators to be paired for the co-assignment to the new incident (step 314). Subsequently, the assignment server 140 may co-assign the new incident to the selected pair of operators (step 310).

To further illustrate the operations of the assignment server 140, reference is now made to an illustrative exemplary embodiment that is a continuation of the exemplary embodiment described above with regard to the method 200. Thus, the command groups may have been ranked according to the corresponding skill impact metric and a median value of the number of command groups serves as a dividing line to rank the command groups into a first category in which to warrant co-assignment and a second category in which to omit co-assignment. Furthermore, for each command group, the operators may have been identified as capable or incapable of being assigned to an incident involving the command group with a high likelihood of success in resolving the incident. Each group of operators may have also been ranked based on their experience. According to the illustrative exemplary embodiment, the assignment server 140 may have identified that the command group that is to be used for the new incident has a ranking of four among the twenty command groups. Being in the top half, the assignment server 140 may have determined that the command group has a relatively high skill impact metric such that a co-assignment to the new incident may benefit the operators individually and as a whole. The assignment server 140 may also reference the ordered lists of experienced and inexperienced operators to be paired for co-assignment to the new incident. Thus, the assignment server 140 may identify the highest ranking experienced operator and the lowest inexperienced operator to be paired for co-assignment to the new incident.

As described above, the assignment server 140 may incorporate further features or optimizations that improve the manner in which a new incident is co-assigned to a plurality of operators. Thus, the method 300 may be modified to incorporate such optimizations. For example, the method 300 may include operations involving determining a teaching score for each experienced operator and a learning score for each inexperienced operator. Based on the teaching score and the learning score, the selections of the operators may be modified to ensure that a proper teaching lesson may be formed from the co-assignment. In another example, the method 300 may include operations involving determining an operator workload score that determines a utilization of each operator as a combination of a number of assigned incidents and a number of other operators the operator has recently trained. In a further example, the method 300 may include operations that compensate for inexperienced operators who have a low learning score so that these inexperienced operators are prevented from perpetually being omitted from consideration in being co-assigned.

The exemplary embodiments are configured to determine when and how to co-assign a new incident involving a command group associated with one or more skills where the co-assignment includes at least one experienced operator and at least one inexperienced operator such that the experienced operator may teach the inexperienced operator of the command group. By first determining a skill impact that the skills in the command group may have with regard to a group of operators, the exemplary embodiments may identify the command groups that may benefit from co-assigning operators to an incident while identifying other command groups that may have costs that outweigh the benefit of co-assignment. When a command group that is to use co-assignment is determined, the exemplary embodiments may select an experienced operator who is capable of resolving the incident and an inexperienced operator who may learn the skills to resolve the incident for future cases.

Figure 4:
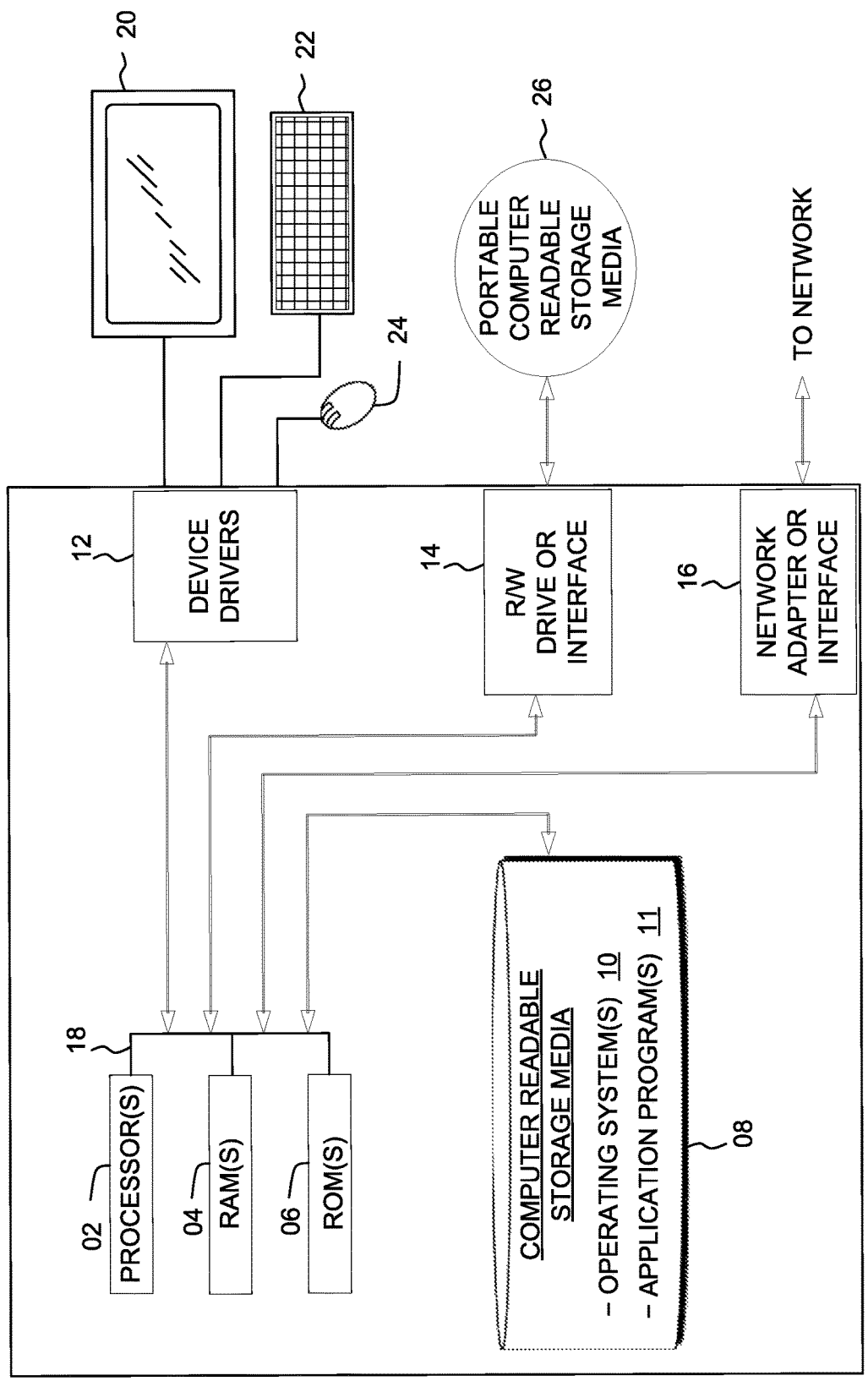
FIG. 4 depicts an exemplary block diagram depicting the hardware components of the incident assignment system 100 of FIG. 1, in accordance with the exemplary embodiments.

FIG. 4 depicts a block diagram of devices within the incident assignment system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
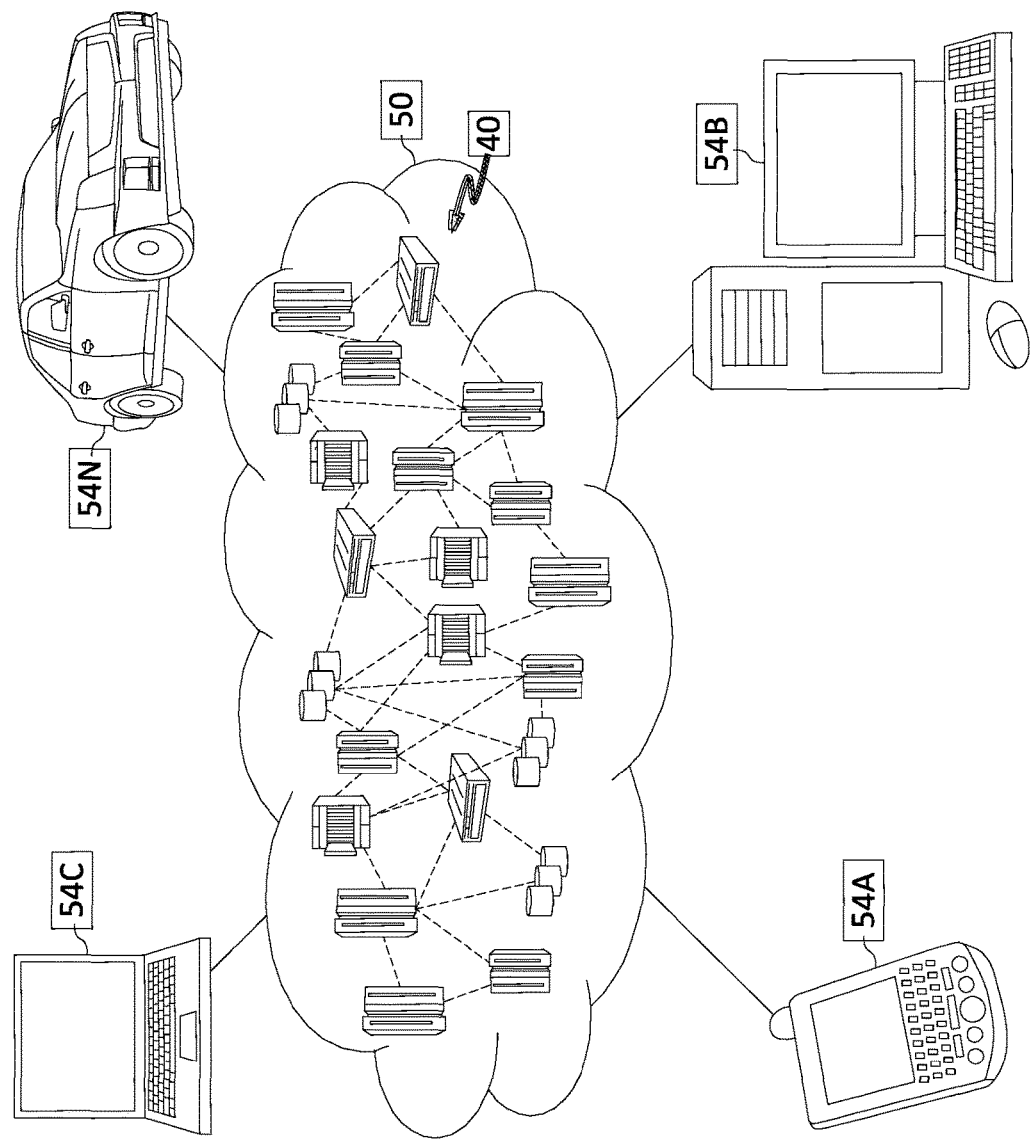
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
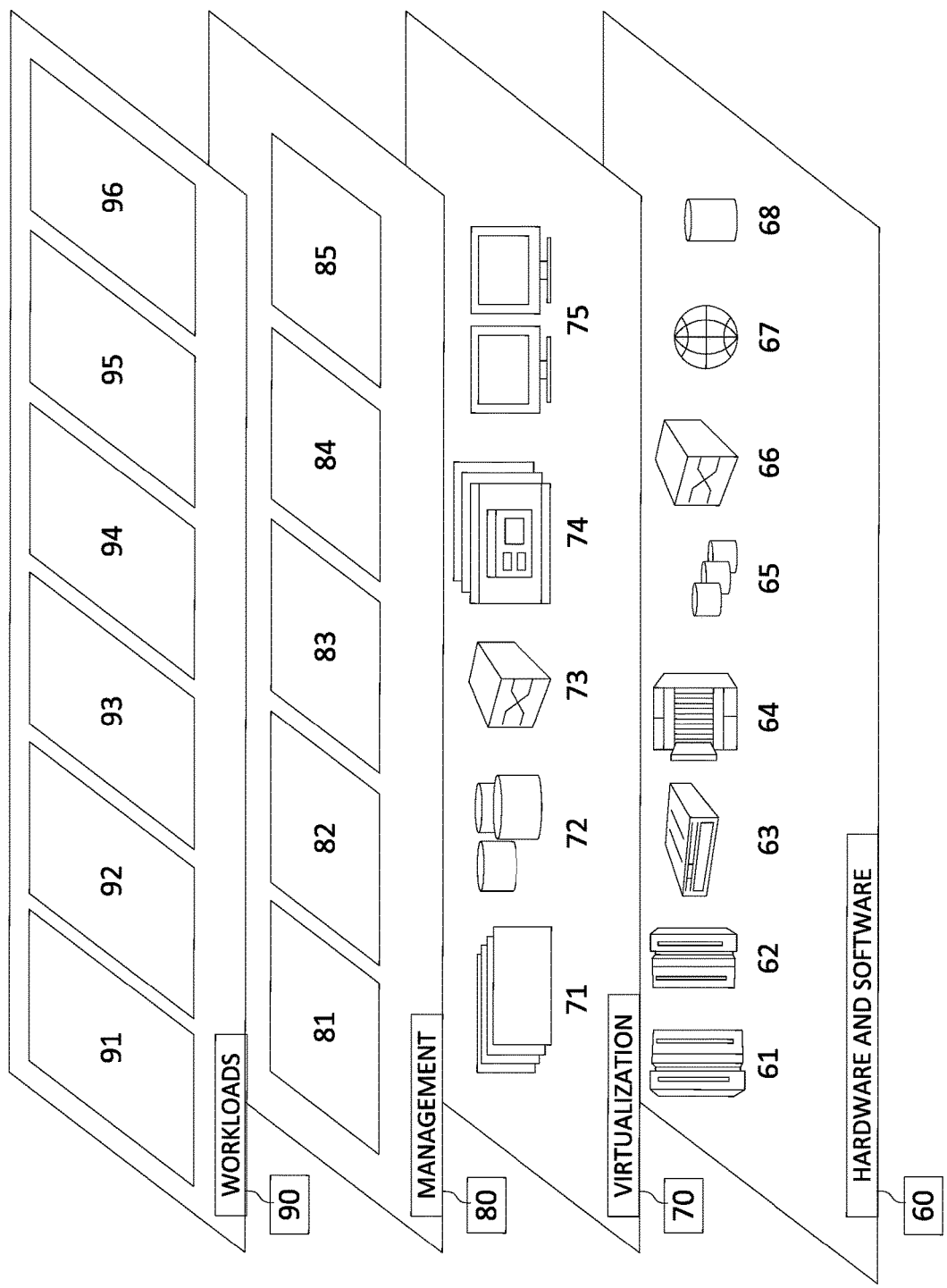
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assignment processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for co-assigning operators to service an incident with a first operator educating a second operator of skills used in servicing the incident, the method comprising:
   one or more computer processors, one or more computer-readable storage media, and program instructions stored on the one or more of the computer-readable storage media for execution by at least one of the one or more processors capable of performing a method, the method comprising:
   determining a type of incident associated with the incident;
   determining a command group applicable for use based on the type of incident according to a first mapping, the first mapping indicative of a mapping between the command group and the type of incident based on historical resolutions of historical incidents, the command group including at least one command used in resolving the type of incident for a historical incident;
   determining the first operator for co-assignment according to a second mapping, the second mapping indicative of a mapping between the command group and the first operator based on successful historical resolutions of historical incidents by the first operator;
   determining the second operator for the co-assignment according to the second mapping, the second mapping further indicative of a mapping between the command group and the second operator based on a lack of experience in using the command group;
   determining a teaching score of the first operator, the teaching score indicative of first historical teaching sessions, the teaching score being a first metric calculated based on an operator learning metric for historical operators corresponding to the first successful historical teaching sessions whom the first operator taught;
   determining a learning score of the second operator, the learning score indicative of second historical teaching sessions, the learning score being a second metric calculated based on results of the second historical teaching sessions relative to a specified time;
   determining an operator workload score of the first operator, the operator workload score being indicative of a number of assigned historical incidents and a number of teaching sessions involving the first operator;
   co-assigning the incident to the first operator and the second operator, wherein the first and second operators are determined based on the second mapping, the teaching score, the learning score, and the operator workload score as an optimization operation balancing the respective metrics and preventing the second operator from being omitted from selection, wherein the incident is co-assigned within a collaboration tool by passing the incident into the collaboration tool using an application programming interface; and
   updating the teaching score of the first operator and the learning score of the second operator.

2. The computer-implemented method of claim 1, further comprising:
   determining a skill impact metric for the command group, the skill impact metric being indicative of a usefulness in utilizing the co-assignment; and
   determining whether the command group qualifies for the co-assignment based on the skill impact metric and further skill impact metrics for further command groups.

3. The computer-implemented method of claim 2, wherein the skill impact metric is determined based on a skill demand factor that describes a number of events that have required the command group in a predetermined time period, a global skill factor that describes a mapping between the command group and a population of operators who have successfully used the command group, and a skill distribution factor that describes a distribution across the population of operators with regard to the command group and the population of operators.

4. The computer-implemented method of claim 2, further comprising:
   ranking the command group relative to the further command groups,
   wherein, as a result of the command group qualifying for the co-assignment, the command group satisfies a teaching threshold within the ranking.

5. The computer-implemented method of claim 1, wherein the first operator is a highest ranked among the first group; and wherein the second operator is a lowest ranked among the second group.

6. The computer-implemented method of claim 1, further comprising:
   determining when the second operator has a learning score below a predetermined threshold; and
   selecting an alternative teaching session for the second operator.

7. A computer program product for co-assigning operators to service an incident with a first operator educating a second operator of skills used in servicing the incident, the computer program product comprising:
   one or more non-transitory computer-readable storage media and program instructions stored on the one or more non-transitory computer-readable storage media capable of performing a method, the method comprising:
   determining a type of incident associated with the incident;
   determining a command group applicable for use based on the type of incident according to a first mapping, the first mapping indicative of a mapping between the command group and the type of incident based on historical resolutions of historical incidents, the command group including at least one command used in resolving the type of incident for a historical incident;

determining the first operator for co-assignment according to a second mapping, the second mapping indicative of a mapping between the command group and the first operator based on successful historical resolutions of historical incidents by the first operator;

determining the second operator for the co-assignment according to the second mapping, the second mapping further indicative of a mapping between the command group and the second operator based on a lack of experience in using the command group;

determining a teaching score of the first operator, the teaching score indicative of first historical teaching sessions, the teaching score being a first metric calculated based on an operator learning metric for historical operators corresponding to the first successful historical teaching sessions whom the first operator taught;

determining a learning score of the second operator, the learning score indicative of second historical teaching sessions, the learning score being a second metric calculated based on results of the second historical teaching sessions relative to a specified time;

determining an operator workload score of the first operator, the operator workload score being indicative of a number of assigned historical incidents and a number of teaching sessions involving the first operator;

co-assigning the incident to the first operator and the second operator, wherein the first and second operators are determined based on the second mapping, the teaching score, the learning score, and the operator workload score as an optimization operation balancing the respective metrics and preventing the second operator from being omitted from selection, wherein the incident is co-assigned within a collaboration tool by passing the incident into the collaboration tool using an application programming interface; and updating the teaching score of the first operator and the learning score of the second operator.

8. The computer program product of claim 7, wherein the method further comprises:

determining a skill impact metric for the command group, the skill impact metric being indicative of a usefulness in utilizing the co-assignment; and determining whether the command group qualifies for the co-assignment based on the skill impact metric and further skill impact metrics for further command groups.

9. The computer program product of claim 8, wherein the skill impact metric is determined based on a skill demand factor that describes a number of events that have required the command group in a predetermined time period, a global skill factor that describes a mapping between the command group and a population of operators who have successfully used the command group, and a skill distribution factor that describes a distribution across the population of operators with regard to the command group and the population of operators.

10. The computer program product of claim 8, wherein the method further comprises:

ranking the command group relative to the further command groups, wherein, as a result of the command group qualifying for the co-assignment, the command group satisfies a teaching threshold within the ranking.

11. The computer program product of claim 7, wherein the first operator is a highest ranked among the first group; and wherein the second operator is a lowest ranked among the second group.

12. The computer program product of claim 7, wherein the method further comprises:

determining when the second operator has a learning score below a predetermined threshold; and selecting an alternative teaching session for the second operator.

13. A computer system for co-assigning operators to service an incident with a first operator educating a second operator of skills used in servicing the incident, the computer system comprising:

one or more computer processors, one or more computer-readable storage media, and program instructions stored on the one or more of the computer-readable storage media for execution by at least one of the one or more processors capable of performing a method, the method comprising:

determining a type of incident associated with the incident;

determining a command group applicable for use based on the type of incident according to a first mapping, the first mapping indicative of a mapping between the command group and the type of incident based on historical resolutions of historical incidents, the command group including at least one command used in resolving the type of incident for a historical incident;

determining the first operator for co-assignment according to a second mapping, the second mapping indicative of a mapping between the command group and the first operator based on successful historical resolutions of historical incidents by the first operator;

determining the second operator for the co-assignment according to the second mapping, the second mapping further indicative of a mapping between the command group and the second operator based on a lack of experience in using the command group;

determining a teaching score of the first operator, the teaching score indicative of first historical teaching sessions, the teaching score being a first metric calculated based on an operator learning metric for historical operators corresponding to the first successful historical teaching sessions whom the first operator taught;

determining a learning score of the second operator, the learning score indicative of second historical teaching sessions, the learning score being a second metric calculated based on results of the second historical teaching sessions relative to a specified time;

determining an operator workload score of the first operator, the operator workload score being indicative of a number of assigned historical incidents and a number of teaching sessions involving the first operator;

co-assigning the incident to the first operator and the second operator, wherein the first and second operators are determined based on the second mapping, the teaching score, the learning score, and the operator workload score as an optimization operation balancing the respective metrics and preventing the second operator from being omitted from selection, wherein the incident is co-assigned within a collaboration tool by passing the incident into the collaboration tool using an application programming interface; and updating the teaching score of the first operator and the learning score of the second operator.

14. The computer system of claim 13, wherein the method further comprises:

determining a skill impact metric for the command group, the skill impact metric being indicative of a usefulness in utilizing the co-assignment; and determining whether the command group qualifies for the co-assignment based on the skill impact metric and further skill impact metrics for further command groups.

15. The computer system of claim 14, wherein the skill impact metric is determined based on a skill demand factor that describes a number of events that have required the command group in a predetermined time period, a global skill factor that describes a mapping between the command group and a population of operators who have successfully used the command group, and a skill distribution factor that describes a distribution across the population of operators with regard to the command group and the population of operators.

16. The computer system of claim 14, wherein the method further comprises:

ranking the command group relative to the further command groups, wherein, as a result of the command group qualifying for the co-assignment, the command group satisfies a teaching threshold within the ranking.

17. The computer system of claim 13, wherein the first operator is a highest ranked among the first group; and wherein the second operator is a lowest ranked among the second group.

18. The computer-implemented method of claim 1, displaying a collaboration session between the first operator and second operator within the collaboration tool for one or more other operators.

* * * * *